United States Patent [19]
Banbury

[11] Patent Number: 5,243,448
[45] Date of Patent: Sep. 7, 1993

[54] HEAD-UP DISPLAY

[75] Inventor: John R. Banbury, Fleet, England

[73] Assignee: The Secretary of State for Defence in Her Britannic Majesty's Government of the United Kingdom of Great Britain and Northern Ireland, London, England

[21] Appl. No.: 671,814

[22] PCT Filed: Sep. 25, 1989

[86] PCT No.: PCT/GB89/01125
 § 371 Date: Apr. 1, 1991
 § 102(e) Date: Apr. 1, 1991

[87] PCT Pub. No.: WO90/03590
 PCT Pub. Date: Apr. 5, 1990

[30] Foreign Application Priority Data
 Sep. 28, 1988 [GB] United Kingdom ............... 8822731

[51] Int. Cl.$^5$ .................. G02B 5/32; G02B 27/10; G02B 27/42
[52] U.S. Cl. ..................... 359/13; 359/16; 359/630
[58] Field of Search ............ 359/13, 14, 15, 16, 359/19, 24, 630

[56] References Cited

U.S. PATENT DOCUMENTS

| | | | |
|---|---|---|---|
| 4,613,200 | 9/1986 | Hartman | 359/630 |
| 4,818,048 | 4/1989 | Moss | 359/13 |
| 4,832,427 | 5/1989 | Nanba et al. | 359/19 |
| 4,880,287 | 11/1989 | Moss | 359/14 |
| 4,932,731 | 6/1990 | Suzuki et al. | 359/13 |
| 4,967,191 | 10/1990 | Iino | 359/13 |

FOREIGN PATENT DOCUMENTS

| | | | |
|---|---|---|---|
| 0007039 | 1/1980 | European Pat. Off. . | |
| 0286962 | 10/1988 | European Pat. Off. . | |
| 2594563 | 8/1987 | France . | |
| 62-94816 | 5/1987 | Japan | 359/13 |
| 1602373 | 11/1981 | United Kingdom . | |
| 2123974A | 2/1984 | United Kingdom . | |
| 2197728B | 2/1990 | United Kingdom . | |

Primary Examiner—Martin Lerner
Attorney, Agent, or Firm—Nixon & Vanderhye

[57] ABSTRACT

A low-cost head-up display suitable for automobiles consists of a transmitting diffractive element (3) located below an observer's line of sight for diffracting light from an information display (2) onto a combiner glass or the windscreen (1) of the automobile, and an opaque mask (4) positioned close to the diffractive (3) element so that specular reflections from the display (2) are screened from the observer's field of view.

9 Claims, 5 Drawing Sheets

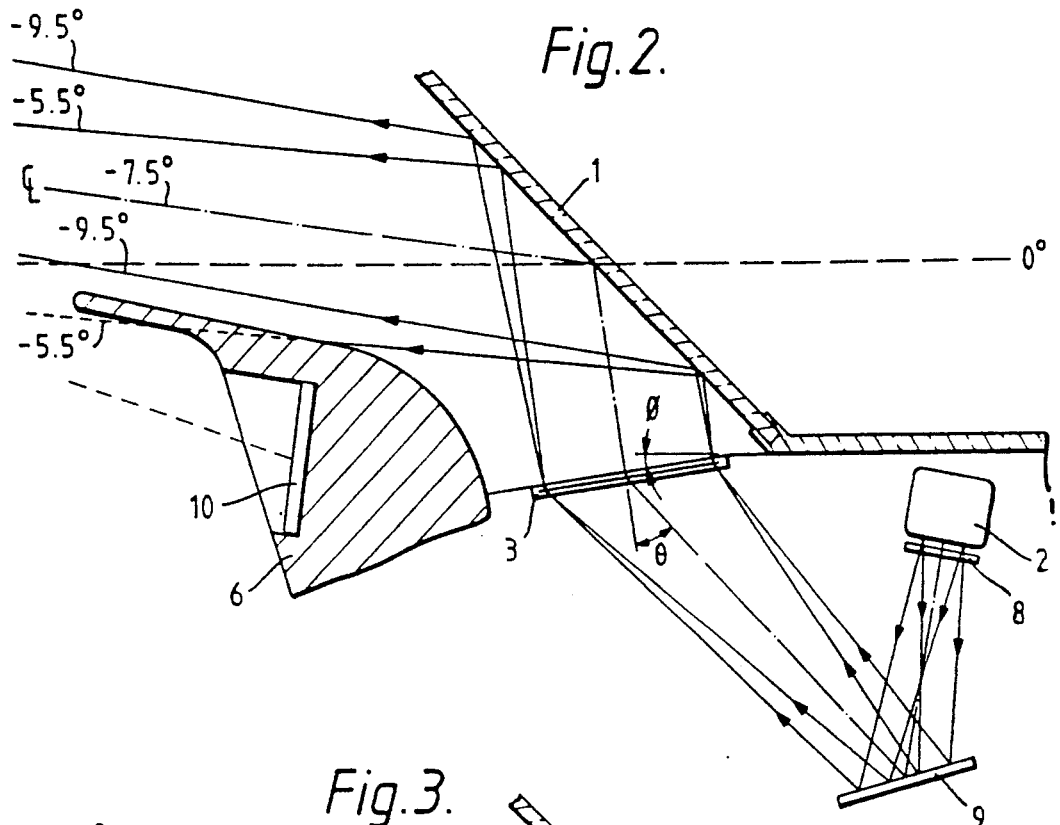
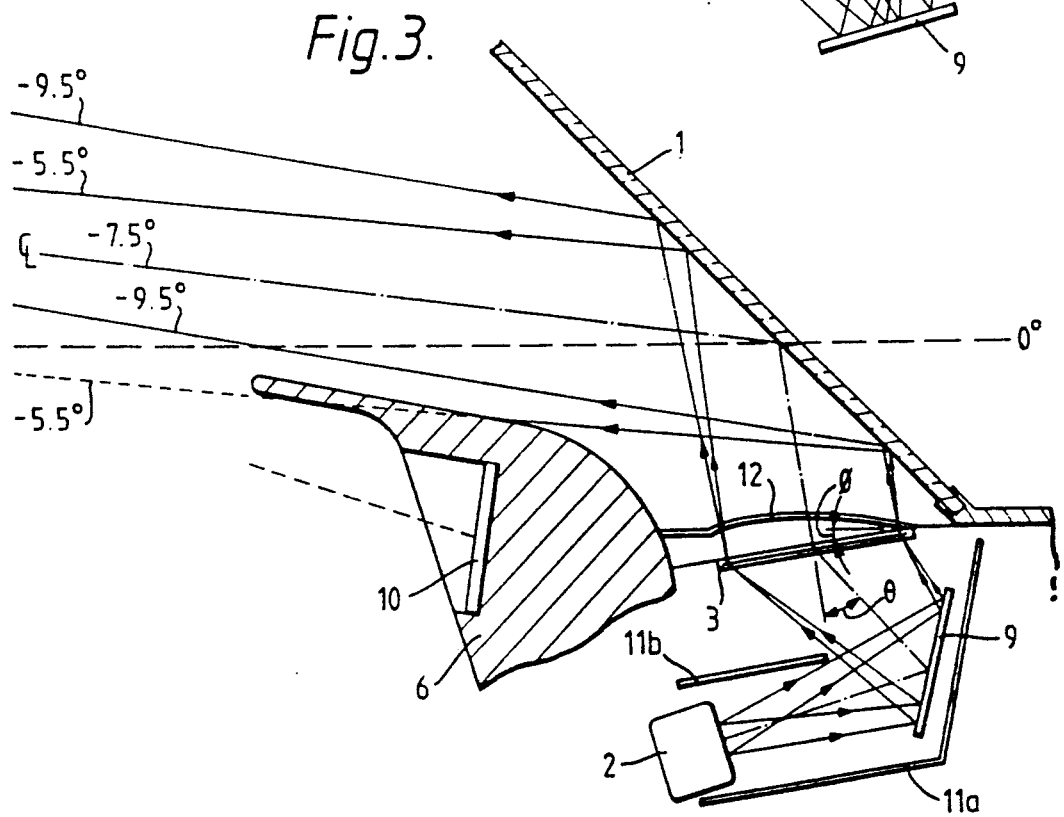

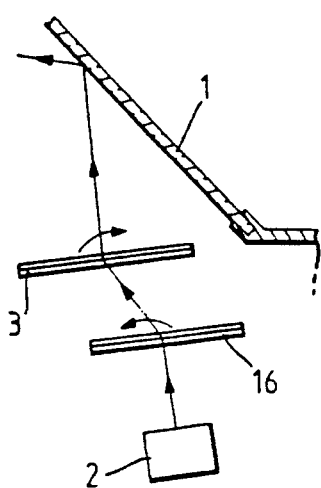
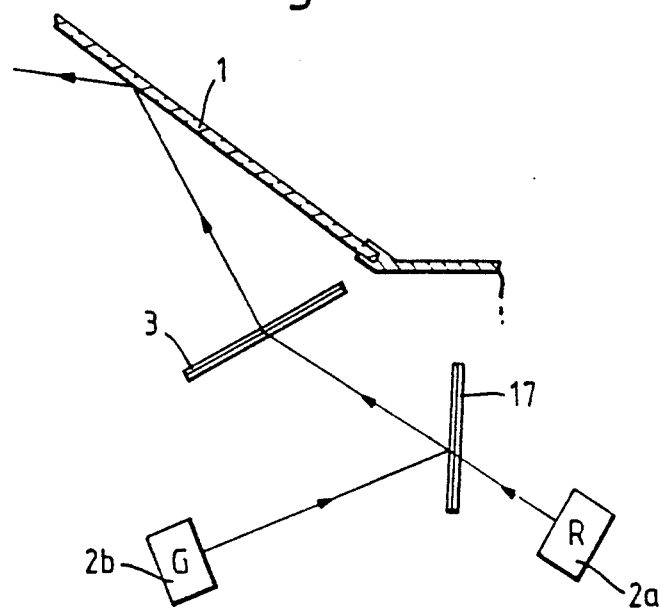
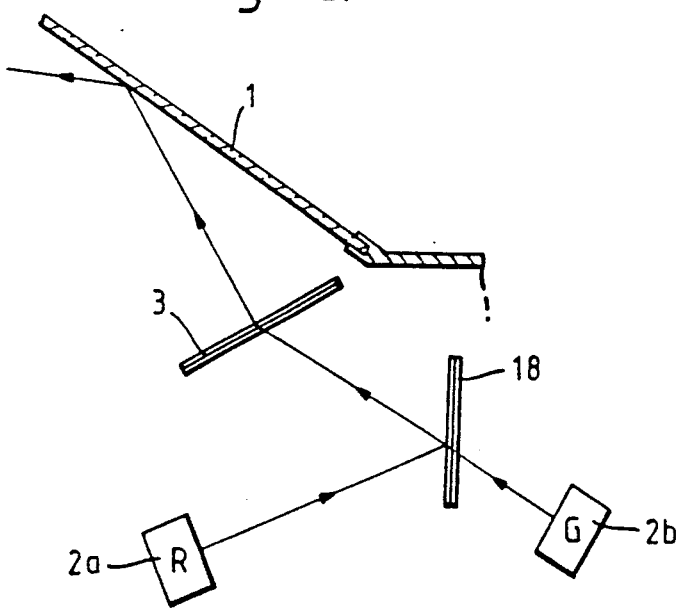

HEAD-UP DISPLAY

This invention relates to a head-up display arrangement particularly suitable for land or sea vehicles or helicopters. Head-up displays, which present displays of indicia and/or measurement indications superimposed on any external view seen by a pilot, were originally developed for and are now normal equipment in high-speed military aircraft. Their advantage is that they present essential information to a pilot without requiring him to redirect or (if collimated) refocus his vision. This would also be a useful advantage in land and sea vehicles and in helicopters, but for such applications it is preferable that much less expensive head-up display arrangements should be devised.

A major concern in all head-up displays is to provide sufficient contrast between the display and the background, and to minimise unwanted reflections of ambient light from the display unit, which tend to seriously degrade the contrast and visibility of the display indicia. In many designs for use in military aircraft expensive high-brightness display tubes are used to maintain sufficient contrast.

The object of the present invention is to provide a colour head-up display using a comparatively simple and inexpensive arrangement which achieves a considerable reduction in the proportion of ambient light which can be reflected from the display into the observer's field of view.

According to the present invention there is provided a head-up display arrangement for a vehicle, for presenting an optical display of information superimposed on a forward external view seen by an observer in the vehicle, including display means for producing a display of information, an optically transmitting diffractive element placed below the observer's line-of-sight to the external view, light from the display means (when in use) being incident on the diffractive element from a direction below and forward of the diffractive element and being diffracted by the diffractive element onto a partially relecting surface and thence to the observer's eye and characterised in that the diffractive element is inclined towards the rear of the vehicle.

Light is incident on the diffractive element from a direction below and forward of the diffractive element (i.e. nearer the front of the vehicle) rather than below and behind it in order to provide greater rejection of unwanted ambient light.

The partially reflecting surface may be the windscreen of the vehicle of a separate combiner. Such a combiner, which would be placed between the windscreen and the observer, may be adjustable so that the display light reflected off its surface is visible and in a suitable position in the field of view to observers of differing heights. The windscreen or combiner may have a coating comprising a narrow band filter which reflects at the display light wavelength without substantially reducing transmission of the external view and helps to reduce the unwanted effects of stray ambient light. The combiner may be comparatively thin and planar and should be used if curvature of the windscreen would distort the image of the display seen by the observer. Furthermore, it may be mounted at an angle which may be better for viewing and improving rejection of unwanted reflections.

For most installations, the optimum value of the angle of inclination of the diffractive element to the horizontal, $\phi$, lies between 5° and 30°. This tilting of the diffractive element makes it easier to mask or screen unwanted upward reflections from the observer, without vignetting his view of the display information.

A high value for the diffraction angle, $\theta$, of the diffractive element is advantageous from the point of view of sunlight reflections. For most installations the optimum value of $\theta$ lies between 5° and 45°. Preferably, the diffraction angle $\theta$ is such that the central ray of the head-up display arrangement's field of view enters the diffractive element at an angle parallel to or diverging away from the windscreen. Under such conditions there is a further improvement in the rejection of external sunlight. The choice of $\theta$ and the overall geometry of the head-up display arrangement are preferably such that only the first order diffraction reaches the observer's eyes, i.e. so that zero, second and higher orders are diffracted out of the observer's field of view. This provision contributes to the reduction of unwanted stray reflections because ambient light passing through the diffractive element is dispersed over a range of angles and only part of it reaches the display unit for subsequent reflection back into the observer's eye.

The transmitting, diffractive element could take the form of any of three known types of hologram viz amplitude, phase or surface relief. Their optical properties and methods of construction are well described in the literature, (see for example "Principles of Holography" by H M Smith, J Wiley 1969). Amplitude holograms however, are favoured least for this application because of the degree of scattering which they introduce and their low efficiency. Surface relief holograms have very wide angular bandwidth which makes suppression of spurious images more difficult. However, they are easy to replicate at low cost. Transmission and reflection holograms may be made by the known technique involving the interference between two beams of coherent light derived from a common laser source, whereby interference fringes are formed and recorded on a plate coated with photo-resist. To make a transmission hologram, the two beams are directed onto the same side of the plate and in the case of a reflection hologram, the two beams are directed onto opposite sides of the plate. To introduce optical power into a transmitting or reflecting hologram, the detailed fringe pattern can be fixed by using coherent beams originating from any pair of conjugate positions which are located in accordance with the focal length for that optical power.

Alternatively, the diffractive element could be a diffraction grating.

It is preferable for the display means to produce light in one or more narrow spectral bands. The display means could be located underneath the dashboard. Although a suitably-illuminated liquid crystal display could be used, it is preferable for the display to be produced by a flood-gun cathode-ray tube, for instance as described in patents GB 1536776, GB 1569973 and GB 2131225. Such flood-gun tubes are comparatively inexpensive and can produce high-brightness, multi-coloured displays. Phosphors most suitable for this application are P43, P44 and P53 (green) and P56 (red) because of their narrow-band output. Narrow-band displays are preferred so that dispersion produced by the diffractive element is kept within tolerable limits. Suitable narrow-band filters which may be placed over the display phosphors will reduce the wavelength-range over which sunlight can be reflected from the display screen.

One embodiment of the invention allows a multi-colour display to be generated by overlaying images from red, green and (if needed) blue phosphors. For more simple installations just one phosphor may be employed giving a single colour display.

The light from the display may be directly incident on the diffractive element or it may follow a folded path, being reflected off a reflective element before reaching the transmitting diffractive element. A folded path may be more convenient in some installations, depending on the volume and shape of the space available under the vehicle's dashboard. Furthermore, the folded arrangement allows the final image to appear more distant to the observer. Alternatively, this can be achieved of course by incorporating optical power in the transmitting diffractive element and/or in the reflective element. Preferably, in these cases the focal length is kept relatively long so that the ensuing aberrations are kept to a minimum. In the case of a multi-colour display employing a red and a green phosphor for example, the use of a small additional optical power for the green waveband relative to the red waveband allows effective focal length and image magnification to be matched for these two colours i.e. longitudinal dispersion introduced by the diffracting element is compensated. A reflection hologram constructed by the known techniques referred to earlier could serve this purpose satisfactorily. Lateral dispersion introduced by the diffracting element (particularly for large values of $\theta$) can also be compensated by incorporating a grating in one of the reflective elements. Again this could be achieved by known holographic techniques. By controlling the overall dispersion throughout the head-up display arrangement the images from the physically separate green and red phosphors may be overlaid or brought closer together in the observer's view. Hence an arrangement having red and green phosphors can produce images of red, orange, yellow and green and the aforementioned dispersion-correction measures preserve the sharpness of the image.

The display unit can be made to produce selected specific displays when required, some of which may be warning indications preferably coloured red or orange, and some of which may indicate measurements for instance speed, engine revs/min, or temperatures, preferably coloured green but possibly becoming yellow, orange and then red when the measurement shows an undesirable condition, for instance exceeding a speed limit or overheating.

The principles of dispersion correction may be further extended to include a third (blue) channel in which the red, green and blue phosphors are physically separate but overlaid on the final image seen by the observer because of the differing dispersion effects for the different wavelengths. The red element has the maximum dispersion but uses a phosphor with the narrowest emission waveband.

(Aberration and dispersion correction with multi-element holograms has been described for transmission elements in Applied Optics Vol 11 No 8 (1972) pp 1686–1696 by L N Latta).

Optionally, an opaque screen is placed between the observer and the diffractive element to obstruct upward reflections of ambient light from the said diffractive element directed towards the observer's eye position. The screen could form part of the vehicle's dashboard. Other baffles and light absorbing surfaces may be placed underneath the dashboard at locations where they would be most effective in reducing the sunlight entry angles over which access to the display surface is possible. A narrow-band domed filter may be placed over the diffractive element so that all other wavelengths constituting unwanted ambient light are absorbed or reflected (depending on the type of filter used) away from the observer's eyes, yet narrow-band light from the display is transmitted to the observer.

By way of example, some embodiments of the invention will now be described with reference to the drawings of which:

FIGS. 2, 3 and 4 are respectively diagrams of alternative single-colour head-up display arrangements in accordance with the invention;

FIGS. 6A to C illustrates methods of compensation for lateral dispersion and

Figure 7:
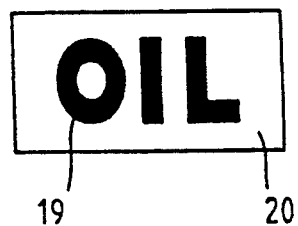

FIG. 7 is a representation of a preferred form of display.

Figure 1:
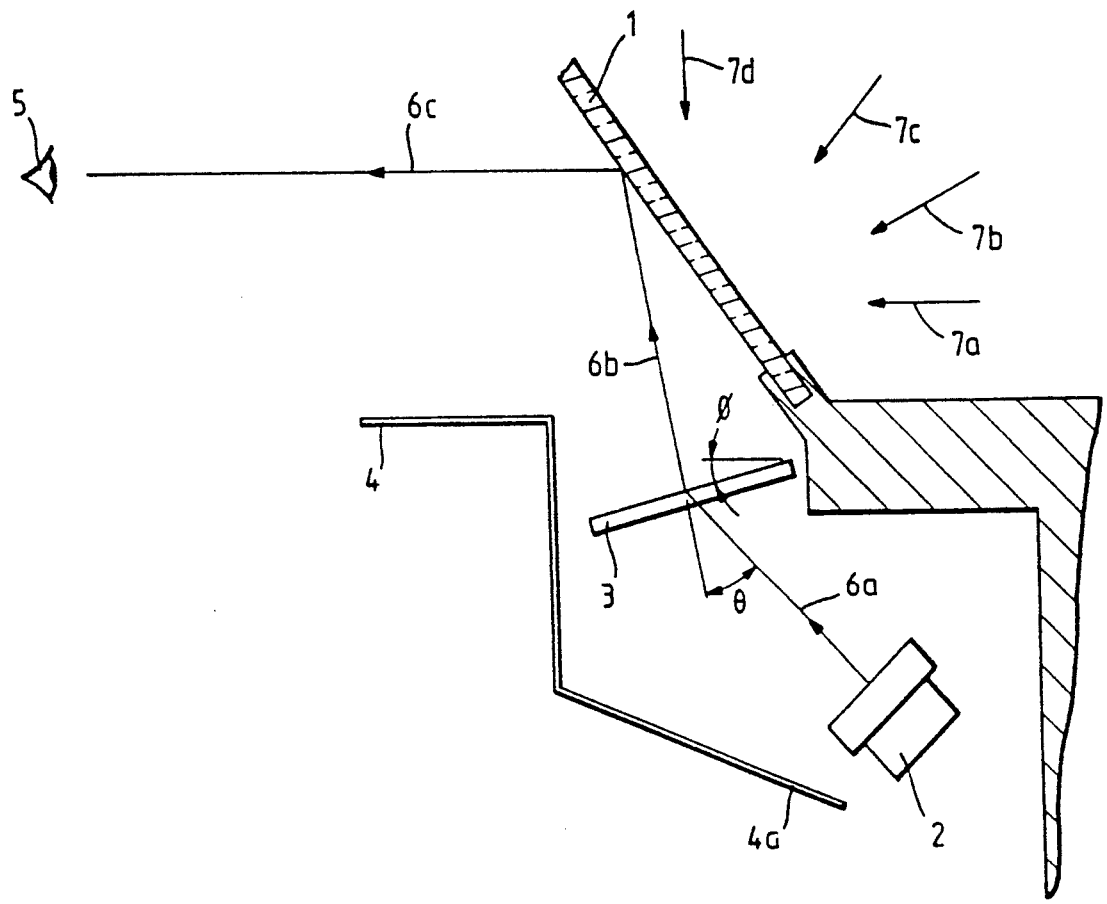
FIG. 1 is a schematic diagram showing the layout of the essential constituents of a head-up display arrangement in accordance with the invention.

FIG. 1 shows in cross-section the windscreen 1 of a vehicle which might be a car, a lorry, a ship or a helicopter. A display unit 2 which is a flood-gun cathode-ray tube as described in patent GB 2131225 is mounted below and in front of a transmitting diffractive element 3 which itself is mounted a little below the windscreen 1. The diffractive element 3 is a surface-relief transmission hologram made as a mechanical copy of a master formed by known techniques involving the exposure of photo-resist material to a pattern of interference fringes. It is designed to diffract the narrow-band light from the display unit 2 through an angle $\theta$ which is in the range $5° \leq \theta \leq 45°$. As shown the diffractive element 3 is tilted away from the windscreen 1 towards the rear of the vehicle, at an angle $\phi$ to the horizontal which is in the range $5° \leq \phi \leq 30°$. An opaque screen 4 is suitably placed to obstruct direct viewing at the observer's eye position 5 of possible specular reflections from the diffractive element 3. Part of the screen 4a which is provided with a light-absorbing surface also assists in reducing unwanted reflections at the observer's eye.

The arrows 6a, 6b, 6c represent the optical path of light from the display unit 2 through the diffractive element 3 to a reflection at the windscreen 1 to the observer's eye position 5. Arrows 7a to 7d represent rays of ambient light incident at various angles on the front of the windscreen 1. The preferred position of the diffractive element 3 slightly below the bottom of the windscreen 1 screens it from the lowest rays 7a. Slightly higher rays 7b and 7c may reach the diffractive element 3 and may cause specular reflections but the opaque screen 4 is placed to intercept these reflections and the 'rainbow' diffracted reflections off the surface where they would otherwise reach the observer's eye.

Near-vertical ambient light 7d which passes down through the windscreen will reach the diffractive element 3 and some of it may be reflected upwards but the tilt of the diffractive element directs much of this stray light towards the roof of the vehicle, and only the reflections within the comparatively narrow range of angles can enter the observer's view. The diffractive element 3 is designed for high transmission and may have an anti-reflection coating on its upper surface. Hence most of the near-vertical ambient light which does reach the diffractive element 3 passes through it, and is dispersed spectrally by the diffractive effect of the element 3; only a comparatively small proportion of this light reaches the face of the display unit 2 where it may cause unwanted reflections.

The relative positions of the windscreen 1, diffractive element 3 and screen 4 are such that rays 7a-7c cannot reach the observer's eye 5 as single reflections. Hence there is a high overall rejection of sunlight over a wide range of angles.

The display can be seen reflected off the lower part of the windscreen which in a car might overlay the bonnet and would thus be away from road markings and other features which a driver of the vehicle needs to see clearly.

FIG. 2 shows an alternative head-up display arrangement in which light from the display unit 2 follows a folded path before it is incident on the diffractive element 3. Features common to all figures are designated by the same reference numerals. In this embodiment light from a flood-gun cathode-ray tube 2 having a $Y_2O_3$:Eu (P56) red phosphor is filtered by a suitable red filter 8 so that display light incident on the diffractive element 3 has a narrow spectral band as possible. The filter can also prevent ambient light outside the display waveband from being reflected back onto the diffractive element 3. This phosphor, in conjunction with the red filter ensures that any dispersion introduced by the diffractive element 3 will be less likely to be noticed by the observer. A folded path is achieved by the use of a plane mirror 9 (alternatively this could be a narrow-band-reflector). Part of the vehicle's dashboard 6 which incorporates a head-down display 10 acts as a screen to unwanted ambient light. The arrowed lines on the figure represent the paths of light rays which travel through the arrangement and reach the observer's eye (not shown) after a final reflection off the windscreen 1. The diagram also shows how such an arrangement can provide a head-up display visible over a 4° total field of view in elevation. The centre line of the display makes an angle of −7.5° with the horizontal defined by the vehicle i.e. the 0° datum line.

An alternative folded arrangement shown in FIG. 3 incorporates a flood-gun cathode-ray tube display 2 having a green (e.g. P43) phosphor. Additional aids for reducing unwanted reflections comprise blackened baffles 11a and 11b and a green narrow-band domed filter 12 which is placed close to and over the diffractive element 3. The reflective element 9 is for example a plane mirror or narrow-band reflector (as in the example of FIG. 2). This embodiment may be more convenient than that of FIG. 2 for certain installations. This embodiment would perform equally well with a red phosphor and domed red filter.

Figure 4:
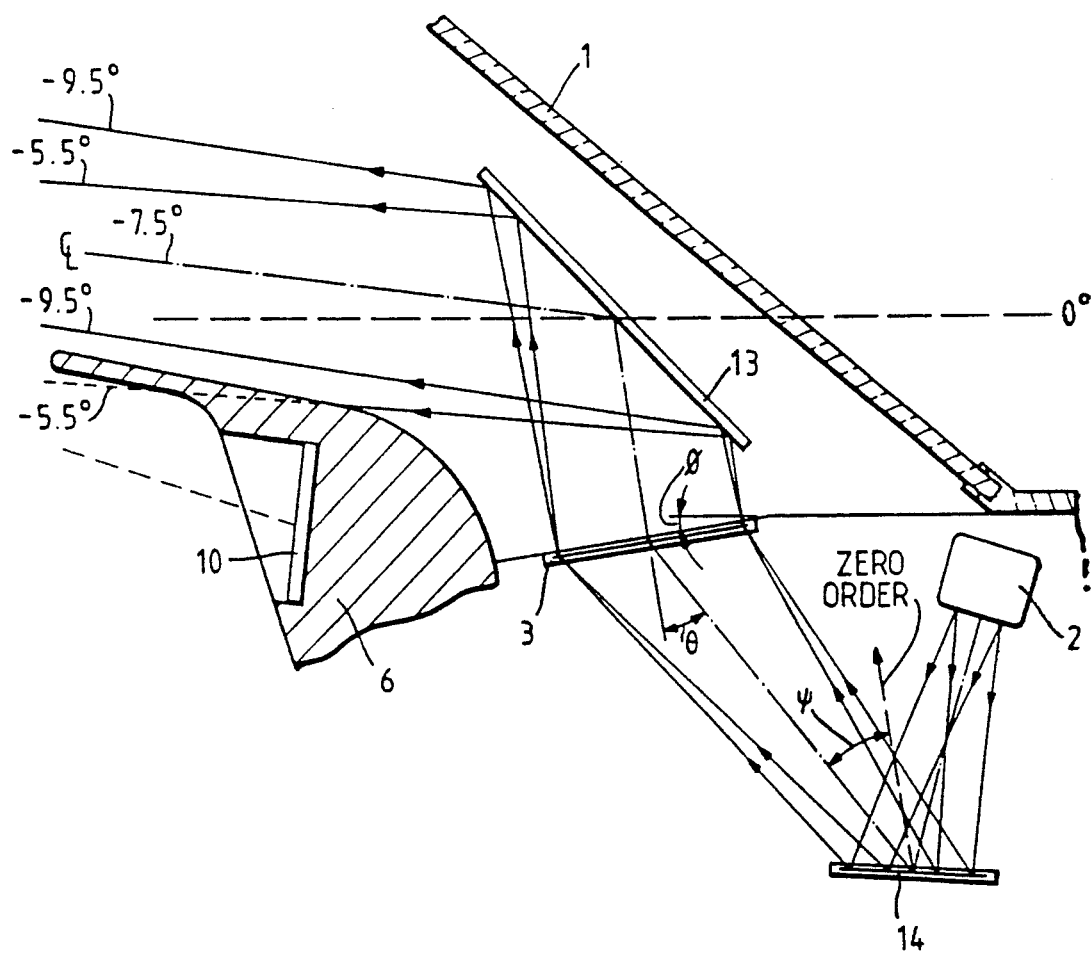

In FIG. 4, the final image is seen reflected off a combiner 13 separate from the windscreen 1. Light from a single colour flood-gun cathode-ray tube 2 is reflected onto the diffractive element 3 by a reflective element 14 which incorporates a grating. This reflective element 14 diffracts an incident beam through an angle $\psi$ in order to compensate for the dispersion introduced by the diffractive element 3 so that a (final) sharp image is seen by the observer. In the case of a green display using a P43 phosphor, the three main central emission lines at around 543 nm, 545 nm and 548 nm are overlaid in the final image by the dispersion action of the diffractive and reflective elements 3 and 14. The minor red, orange and blue side-bands may be suppressed by a suitable green filter placed over the phosphor.

Figure 5:
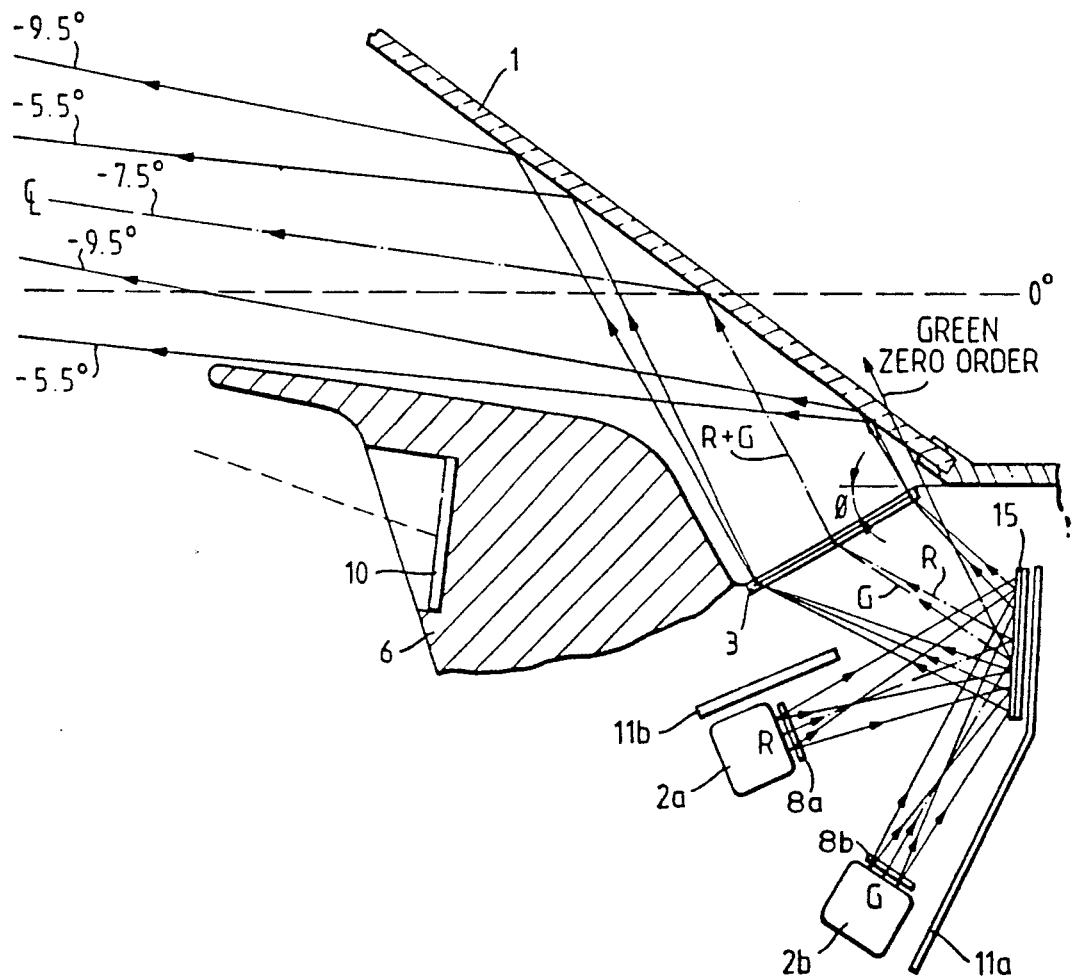
FIG. 5 is a diagram of a multi-colour head-up display arrangement in accordance with the invention.

FIG. 5 shows a head-up display arrangement capable of displaying multi-colour images: viz red, green, orange and yellow. Two flood-gun cathode-ray tubes 2a and 2b are used in this embodiment having red and green phosphors respectively and each being fitted with an appropriate narrow-band filter 8a and 8b. The final image seen by the observer is reflected off a windscreen 1 which makes a smaller angle to the horizontal than does the windscreen illustrated in previously described examples. Blackened baffles 11a and 11b help to cut out unwanted reflections. A reflective element 15 reflects light from both displays 2a and 2b onto the diffractive element 3. The reflective element 15 is a multi-layer holographic element which has the following properties. Firstly, it acts as a narrow-band plane reflector for red light. Secondly, it incorporates a grating which diffracts green light to an extent necessary for compensation of lateral dispersion introduced by the diffractive element 3. Thirdly, it possesses weak, positive, optical power, greater for green than for red light, so that longitudinal dispersion introduced by the diffractive element 3 is also compensated. The separation of the two displays 2a and 2b and the dispersion introduced by the diffractive and reflective elements 3 and 15 are arranged so that the red and green images are overlaid in the observer's field of view. By controlling the relative brightness of the red and green displays, the intermediate colours, orange and yellow can also be displayed.

FIGS. 4 and 5 show two arrangements whereby lateral dispersion introduced by the diffractive element 3 could be compensated. FIGS. 6a-6c illustrate three further alternative methods of dispersion compensation. The arrangement of 6a requires an additional diffractive element 16 diffracting in the opposite direction to element 3. This case corresponds with the method described in the aforementioned article by Latta. In FIG. 6b, the multi-layer element 17 transmits in the red and reflects and diffracts in the green. In FIG. 6c the multi-layer element 18 transmits and diffracts in the green and reflects in the red.

FIG. 7 illustrates a preferred form for display indications in which indicia, characters or digits are shown in silhouette form, as dark or non-illuminated areas 19 in a background of illumination 20. It is considered that this form of presentation is likely to be most effective, because it maximises the illumination in each display, and because the flood-gun or liquid crystal display will present predetermined displays at set places in the field of view and users will soon learn to associate coloured illumination in each place as an associated message, and because colour fringing or double-image effects due to dispersion are considered less annoying when this silhouette form of display is used. If a narrow-band green phosphor (e.g. P43) is used for the display in conjunction with the lower range of angle $\theta$ (e.g. 5°-15°) then this arrangement will produce an acceptable display of dark letters on an illuminated (green) background. For best results, the weak red and blue lines emitted by the P43 phosphor should be filtered out by, for example, placing a suitable celluloid filter over the face of the display.

I claim:

1. A head-up display arrangement for a vehicle, for presenting an optical display of information superimposed on a forward external view seen by an observer (5) in the vehicle, said vehicle having a front and a rear end, said observer having a line-of-sight, said display including:

display means (2) for producing a display of information, and an optically transmitting diffractive element (3) placed below the observer's line-of-sight to the external view, said diffractive element tilted toward the rear of the vehicle at a non-horizontal angle, light from the display means (2) being incident on the diffractive element (3) from a direction below and forward of the diffractive element (3) and being diffracted by the diffractive element (3) onto a partially reflecting surface (1) and thence to the observer's eye (5) and wherein the display means (2) is arranged to present information in a silhouette form, as a non-illuminated icon, digits or legend in an illuminated area (19).

2. Display means according to claim 1 in which said information is in silhouette form, as non-illuminated icons, digits or legends, within an illuminated area.

3. Display means for superimposing information on a forward view through a windscreen of a vehicle, said windscreen including a line-of-sight by an operator of said vehicle, said vehicle having a front and a rear, said means comprising:

means for displaying said information on a screen; and a first optically-transmitting diffractive element located above said means for displaying and below said line-of-sight through the windscreen, said element tilted toward the rear of said vehicle at an angle with the horizontal in the range of from 5° to 30°, said element, responsive to light from said screen in an upward and rearward direction, comprising a means for directing said light towards the windscreen whereby a virtual image of said information is formed forward of the windscreen and superimposed on the external view of an observer within the vehicle wherein said diffractive element has optical power.

4. Display means according to claim 3 in which said information is in silhouette form, as non-illuminated icons, digits or legends, within an illuminated area.

5. Display means for superimposing information on a forward view through a windscreen of a vehicle, said windscreen including a line-of-sight by an operator of said vehicle, said vehicle having a front and a rear, said means comprising:

means for displaying said information on a screen; and a first optically-transmitting diffractive element located above said means for displaying and below said line-of-sight through the windscreen, said element tilted toward the rear of said vehicle at an angle with the horizontal in the range of from 5° to 30°, said element, responsive to light from said screen in an upward and rearward direction, comprising a means for directing said light towards the windscreen whereby a virtual image of said information is formed forward of the windscreen and superimposed on the external view of an observer within the vehicle, including a reflective element located between the screen and the diffractive element, in which the reflective element has optical power.

6. Display means according to claim 5 in which said information is in silhouette form, as non-illuminated icons, digits or legends, within an illuminated area.

7. Display means for superimposing information on a forward view through a windscreen of a vehicle, said windscreen including a line-of-sight by an operator of said vehicle, said vehicle having a front and a rear, said means comprising:

means for displaying said information on a screen; and a first optically-transmitting diffractive element located above said means for displaying and below said line-of-sight through the windscreen, said element tilted toward the rear of said vehicle at an angle with the horizontal in the range of from 5° to 30°, said element, responsive to light from said screen in an upward and rearward direction, comprising a means for directing said light towards the windscreen whereby a virtual image of said information is formed forward of the windscreen and superimposed on the external view of an observer within the vehicle, including a second optically-transmitting diffractive element for dispersing light from the screen in order to compensate for any dispersion introduced by the diffractive element.

8. Display means according to claim 7 in which said information is in silhouette form, as non-illuminated icons, digits or legends, within an illuminated area.

9. Display means for superimposing information on a forward view through a windscreen of a vehicle, said windscreen including a line-of-sight by an operator of said vehicle, said vehicle having a front and a rear, said means comprising:

means for displaying said information on a screen; and a first optically-transmitting diffractive element located above said means for displaying and below said line-of-sight through the windscreen, said element tilted toward the rear of said vehicle at an angle with the horizontal in the range of from 5° to 30°, said element, responsive to light from said screen in an upward and rearward direction, comprising a means for directing said light towards the windscreen whereby a virtual image of said information is formed forward of the windscreen and superimposed on the external view of an observer within the vehicle in which said information is in silhouette form, as non-illuminated icons, digits or legends, within an illuminated area.

* * * * *